United States Patent
Jakubowski et al.

(10) Patent No.: US 7,374,369 B2
(45) Date of Patent: May 20, 2008

(54) METHOD FOR THE EARTHWORK OF A FOUNDATION SUNK FOR A WIND ENERGY FACILITY

(75) Inventors: Alexander Jakubowski, Bottrop (DE); Joachim Nitzpon, Hamburg (DE); Ralf Wederhake, Hamburg (DE); Markus Marburger, Norderstedt (DE)

(73) Assignee: Nordex Energy GmbH (DE)

( * ) Notice: Subject to any disclaimer, the term of this patent is extended or adjusted under 35 U.S.C. 154(b) by 0 days.

(21) Appl. No.: 11/523,942

(22) Filed: Sep. 20, 2006

(65) Prior Publication Data

US 2007/0065234 A1 Mar. 22, 2007

(30) Foreign Application Priority Data

Sep. 21, 2005 (DE) .................... 10 2005 044 989

(51) Int. Cl.
- *E02D 27/50* (2006.01)
- *E02D 27/42* (2006.01)
- *E02D 5/74* (2006.01)
- *E04C 5/12* (2006.01)

(52) U.S. Cl. .............. 405/244; 405/233; 405/239; 52/742.15; 52/742.14; 52/223.4

(58) Field of Classification Search ............ 405/229, 405/232, 233, 236–239, 242, 249; 52/741.11, 52/741.14, 741.15, 742.14, 223.4, 223.5
See application file for complete search history.

(56) References Cited

U.S. PATENT DOCUMENTS 5,533,835 A 7/1996 Angelette .................. 405/229

| | | | |
|---|---|---|---|
| 5,586,417 A * | 12/1996 | Henderson et al. | 52/295 |
| 5,678,382 A | 10/1997 | Naito | 52/745.21 |
| 5,826,387 A * | 10/1998 | Henderson et al. | 52/295 |
| 6,254,314 B1 * | 7/2001 | Park et al. | 405/255 |
| 2004/0098935 A1 | 5/2004 | Henderson | 52/296 |

FOREIGN PATENT DOCUMENTS

DE 102 26 996 A1 4/2003
DE 695 32 510 T2 11/2004

* cited by examiner

*Primary Examiner*—Tara L. Mayo
(74) *Attorney, Agent, or Firm*—Vidas, Arrett & Steinkraus, P.A.

(57) ABSTRACT

A method for the earthwork of a foundation sunk for a wind energy facility, which has the following steps: an anchor cage is provided, consisting of an anchor plate and several anchoring bolts which are connected with the anchor plate, the free ends of the anchoring bolts are guided through bores in at least one load distribution plate the load distribution plate lays on at least three bolt nuts, which are screwed on the anchoring bolts, a reinforcement for the foundation sunk is mounted and the anchor cage is poured in with the reinforcement, the anchoring bolts protruding with the bolt nuts in this, upon subsequent tightening of the anchoring bolts between anchor plate and load distribution plate, the bolt nuts are stripped over the thread of the anchoring bolt and loose their supporting capability.

15 Claims, 2 Drawing Sheets

METHOD FOR THE EARTHWORK OF A FOUNDATION SUNK FOR A WIND ENERGY FACILITY

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for the earthwork of a foundation sunk for a wind energy facility.

In principle, two variants are possible for the anchoring of the pipe tower of a wind energy facility. In the first variant, a pipe piece with a circulating flange is set in concrete into a foundation. The tower foot of the wind energy facility is subsequently screwed with the pipe piece. In the second variant, not a pipe piece but an anchor cage, consisting of several anchoring bolts, is set in concrete in the foundation sunk. The tower foot is then screwed together with the anchoring bolts.

In the last mentioned variant, the anchoring bolts are integrated into an anchor cage. The anchor cage has an anchor plate or an anchor ring on its ground, which is screwed together with the anchoring bolts. The free end of the anchoring bolts protrudes from the foundation sunk, in order to be screwed together with the tower foot flange.

In the part of construction work, the production of the foundation sunk takes place by securing the free ends of the anchoring bolts with a reusable anchoring bolt strickle board. Every time, the anchoring bolt strickle board consists of two half-circles, which are connected with each other through link plates on the perimeter. The half circles have bores at predefined positions for the accommodation of the anchoring bolts. In order to fix the anchoring bolt strickle board, the same is secured on each anchoring bolt through a pair of nuts. Subsequently, the foundation reinforcement is laid through the anchor cage, the foundation sunk and its reinforcement being significantly greater than the anchor cage in this. For example, the foundation sunk may have dimensions of about 15×15 m, whereas the anchor cage has a diameter of 3 to 5 m for example, depending on the size of the pipe tower. After placing the reinforcement and a corresponding planking of the foundation sunk, the latter is poured with concrete. After the pouring, the nut pairs are relieved from the anchoring bolts and the anchoring bolt strickle board is removed. Subsequently, a load distribution plate made in one piece or plural pieces is set on the anchoring bolts and is horizontally oriented on the anchoring bolts, via filling plates and adjustment screws. The oriented load supporting plate is subsequently under-poured with a high-strength swelling mortar. The under-poured load supporting plate forms the support area for a tower foot flange. In the fastening of the tower foot flange, the anchoring bolts are tensioned across the foundation sunk.

It has proven to be disadvantageous in the procedure for the earthwork mentioned above that mounting and dismounting of the anchoring bolt strickle board is an expensive operation. Additionally, inaccuracies in the bores of an anchoring bolt strickle board are created through the reuse thereof, which are maintained when the reinforcement is placed and in the subsequent pouring of concrete, and thus lead to inaccuracies of the anchoring bolt circle.

The present invention is based on the objective to provide a method for the earthwork of a foundation sunk and for the preparation of the installation of the tower, which can be realised with simple means in the part of construction work.

BRIEF SUMMARY OF THE INVENTION

According to the present invention, this objective is resolved by a method with the features of patent claim 1. Advantageous embodiments form the subject matters of the subclaims.

The method according to the present invention for the earthwork of a foundation sunk for a wind energy facility takes an anchor cage as a starting point, which consists of an anchor plate and several anchoring bolts which are connected with the anchor plate. In this, the anchor plate may consist of a continuous plate or a ring. The free ends of the anchoring bolts are guided through a one pieced or plural pieced load distribution plate. The load distribution plate rests on at least three nuts which are screwed on the anchoring bolts. Through the resting of the load distribution plate on them, the anchoring bolts are already sufficiently secured for the following operations.

In a subsequent step, a reinforcement for the foundation sunk is placed and the anchor cage with reinforcement is poured with concrete. Subsequently, the anchoring bolts are tightened when the tower foot flange is fixed. A particular advantage of the method according to the present invention is that a separate anchoring bolt strickle board is omitted. By doing so, the inaccuracies in the orientation of the bolts created through the use of an anchoring bolt strickle plate are avoided. Further, the operation to mount the separate anchoring bolt strickle plate on the anchor bolts and to remove it thereafter is left out. The present invention is based on the finding that the load distribution plate once set on the anchoring bolts can remain there when it is supported via bolt nuts below the load distribution plate. Upon a predetermined force, the bolt nuts break down, in that the thread of the nuts is stripped off on the thread of the anchoring bolt. The bolt nuts which are strippable in this manner do not hinder the tightening of the anchoring bolt when the tower foot is fixed, so that they have lost their original function.

In a preferred embodiment, the load distribution plate is oriented towards the anchoring bolt after pouring in the anchor cage. In doing so, the load distribution plate is brought into a horizontal position as a support for a tower foot. The oriented load distribution plate is subsequently poured, preferably with a high-strength swelling mortar, through which the load distribution plate is bolstered. The orientation of the load distribution plate takes place via the bolt nut on which the load distribution plate lays. In a practical way, the orientation of the load distribution plate with respect to the firstly poured foundation sunk can also take place via adjustment screws and/or filling plates.

On the one hand, in order to make sure sufficient back-up of the load distribution plate, during the placement of the reinforcement for instance, it is necessary that the bolt nut sits sufficiently fast. On the other hand, it is necessary that the thread of the anchoring nut is prone to be stripped off on the thread of the anchoring bolt at a small pre-tension force of the anchoring bolts. Here, it has proven to be particularly advantageous to provide the bolt nuts with a thread from plastic material, preferably bolt nuts made completely from plastic material can be used also.

BRIEF DESCRIPTION OF THE SEVERAL VIEWS OF THE DRAWINGS

The method according to the present invention will be described in more detail in the following.

DETAILED DESCRIPTION OF THE INVENTION

Figure 1:
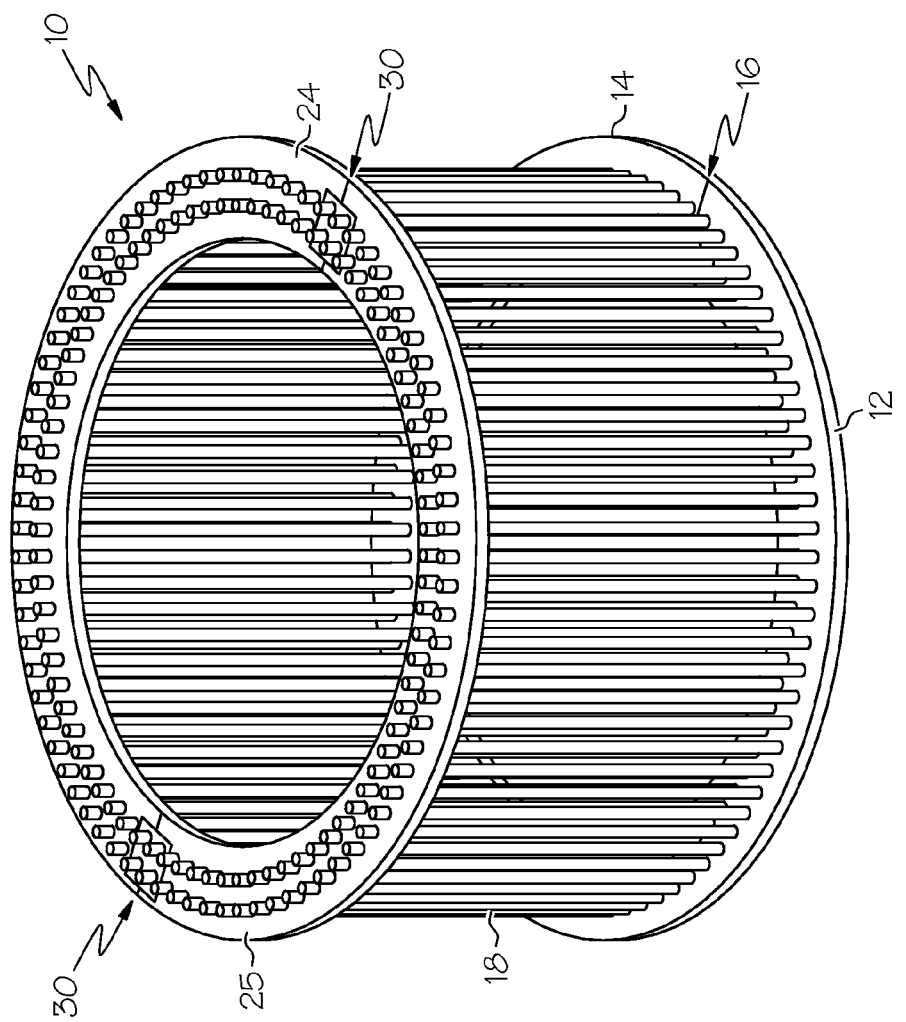
FIG. 1 shows a mounted anchor cage, consisting of two parts, in a perspective view.
Figure 2:
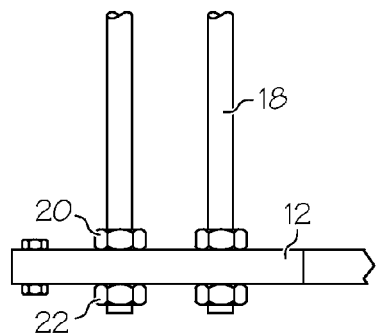
FIG. 2 shows the connection of an anchoring bolt with the anchor plate.

While this invention may be embodied in many different forms, there are described in detail herein a specific preferred embodiment of the invention. This description is an exemplification of the principles of the invention and is not intended to limit the invention to the particular embodiment illustrated FIG. 1 shows a ready mounted anchor cage 10 with a two piece anchor plate 12 and 14. Each one of the anchor plates 12 and 14, which abut with each other on an edge 16 in the mounted condition, forms an half circle. (The rear edge is covered in FIG. 1). Anchoring bolts 18 are screwed in the anchor plates 12 and 14. The anchoring bolts are each one fixed on the anchor plate with a pair of nuts 20.

Figure 3:
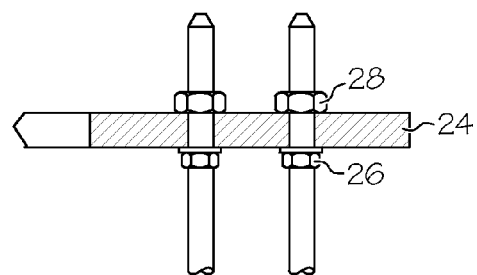
FIG. 3 shows the connection of the load distribution plate with the anchoring bolts and FIG. 4 shows a four-hole strickle board for the orientation of the parts of the anchor cage.

A load distribution plate 24 is set up on the free ends of the anchoring bolts. As can be recognised in FIG. 3, screw nuts from plastic material 26 are provided below the load distribution plate, which support the load distribution plate 24. The plastic screw nuts 26 function for the temporary support of the load distribution plate during the mounting. Also, they permit a definite horizontal levelling of the load support plate. The plastic screw nuts 26 are realised such that they break down by stripping of the thread at a comparatively low pre-tension, yet can securely support the weight of the load distribution plate and additional stresses due to transportation and/or mounting, for instance. As is represented in FIG. 3, the load distribution plate can be fixed on the anchoring bolt by counter nuts 28.

The anchor plates 12 and 14 with the respective fixed anchoring bolts 18 are pre-mounted. The load distribution plate is realised in two pieces, like the anchor plate, and substantially corresponds to the anchor plate in its geometry. The parts of the load distribution plate abut with each other on the edges 30.

Figure 4:
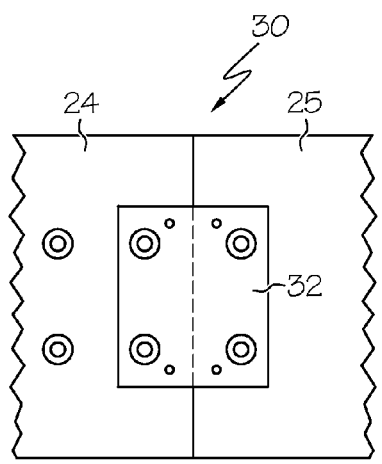

In FIG. 4, it is represented that the parts of the load distribution plate are aligned with respect to each other with the aid of a strickle board 32. The four bore strickle board 32 has a small clearance, so that the parts can be precisely aligned on each other.

The method for making a foundation sunk takes place as follows. First, the anchor cage with the anchoring bolts and the anchor plate is brought into position. The anchor cage has about 80 anchor pairs, which are arranged in a double series. The anchoring bolts are surrounded by plastic enveloping pipes, in order to produce a pre-tension without interconnection in the foundation sunk. The plastic enveloping pipes around the bolts are provided with a shrinkable tube as a sealing, in order to prevent the entrance of pouring mass into the pipe interior.

A load distribution plate in two pieces is set up on the anchor cage, which is brought in position and is horizontally oriented in its position. The load distribution plate takes up the load from the tower and leads it into the foundation sunk. In order to be able to set the load distribution plate 24, 25 more easily on the anchoring bolts, the latter taper conically 34 on their ends. About 24 anchoring bolts are provided with plastic nuts 26. The plastic nuts 26 are completely made from plastic material and have a height of about 20 mm. The load distribution plates 25 and 26 are laid up on the plastic nuts 26. In order to prevent any chipping off of a load distribution plate, at the introduction of the reinforcement for instance, the load distribution plate is additionally secured on the anchoring bolts from the upside by some nuts 28. The nuts 28 must be tightened only with a small momentum in doing so, in order to prevent any premature stripping off of the plastic nuts 26. The anchoring bolts are fixed in their position via the load distribution plates 24 and 26, and they can not change their position upon subsequent placement of the reinforcement and the pouring of the foundation sunk. After the pouring and hardening of the concrete for the foundation sunk, the load distribution plate is oriented horizontally. In doing so, a distance of about 5 cm to the upper edge of the foundation sunk is usually maintained. The orientation of the load distribution plate takes place via the plastic nuts 26 as well as optionally via adjustment screws and filling plates. The cavity thus formed between load distribution plate and upper limit of the foundation sunk is subsequently poured with a high strength swelling mortar. In this, the plastic nuts 26 remain on the anchoring bolts.

The tower foot which is set up has a flange, with bores which correspond to the positions of the anchoring bolts. The set-up tower foot is fixed with the anchor cage via nuts. In doing so, a defined pre-tension is introduced into the anchoring bolts. Through the pre-tension force which is transmitted to the nuts via the load distribution plate, the same are thrusted over the thread on the anchoring bolts and thus they lose their supporting ability.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the earthwork of a foundation comprising:
providing an anchor cage comprising an anchor plate and several anchoring bolts which are connected with the anchor plate, each anchoring bolt comprising a free end;
providing at least three strippable nuts and screwing each strippable nut on an anchoring bolt;
providing a load distribution plate comprising a plurality of bores and orienting the load distribution plate with the free ends of the anchoring bolts guided through the bores and the load distribution plate laying on the strippable nuts;
providing a reinforcement for the foundation;
providing concrete and pouring the foundation such that the anchoring bolts protrude from the concrete with the strippable nuts thereon;
wherein upon subsequent tightening of the anchoring bolts between the anchor plate and the load distribution plate, the strippable nuts are stripped over the thread of the anchoring bolt and lose their supporting capability.

2. The method according to claim 1, characterised in that the load distribution plate is oriented on the anchoring bolts via the strippable nuts after said foundation is poured.

3. The method according to claim 2, characterised in that the load distribution plate is additionally aligned on the anchoring bolts via adjustment screws and/or filling plates.

4. The method according to claim 2, characterised in that the foundation is poured from concrete.

5. The method according to claim 1, characterised in that a high-strength mortar is poured between the concrete foundation and the load distribution plate.

6. The method according to claim 1, characterised in that the strippable nuts for supporting the load distribution plate have a thread from plastic material.

7. The method according to claim 1, characterised in that the load distribution plate comprises two half-circular elements, which are aligned on each other at their butt joint via a strickle board and are connected with each other.

8. A method of forming a foundation comprising:
providing an anchor cage, the anchor cage comprising an anchor plate and several anchor bolts attached to the anchor plate, the anchor bolts extending upwardly from the anchor plate;
providing a plurality of strippable nuts and orienting each strippable nut on an anchor bolt;
providing a load distribution plate, the load distribution plate comprising a plurality of apertures for receiving the anchor bolts;
orienting the load distribution plate such that the anchor bolts extend through the apertures and the load distribution plate is supported by the strippable nuts; and
providing concrete and pouring the footing;
wherein the load distribution plate is not removed, and subsequent tensioning of the anchor bolts causes the strippable nuts to lose their supporting ability.

9. The method of claim 8, further comprising:
providing a tower, the tower comprising bores for receiving the anchor bolts;
positioning the tower above the foundation with the anchor bolts extending through the bores; and
securing said anchor bolts to the tower and tightening said anchor bolts, thereby causing the strippable nuts to lose their supporting ability.

10. The method of claim 8, wherein the footing is poured such that a cavity exists between a top of the concrete and a bottom of the load distribution plate, the method further comprising:
filling the cavity with a high-strength mortar.

11. The method of claim 8, wherein at least three strippable nuts are used.

12. The method of claim 8, wherein the strippable nuts comprise threads that comprise plastic.

13. The method of claim 8, wherein the strippable nuts comprise plastic.

14. The method of claim 8, wherein the strippable nuts are non-metallic.

15. The method of claim 8, wherein the load distribution plate rests horizontally on the strippable nuts.

* * * * *